April 18, 1944.   H. T. KRAFT ET AL   2,347,163
BALLOON FOR CARRYING INCENDIARY MATERIAL
Filed April 5, 1940   3 Sheets-Sheet 2

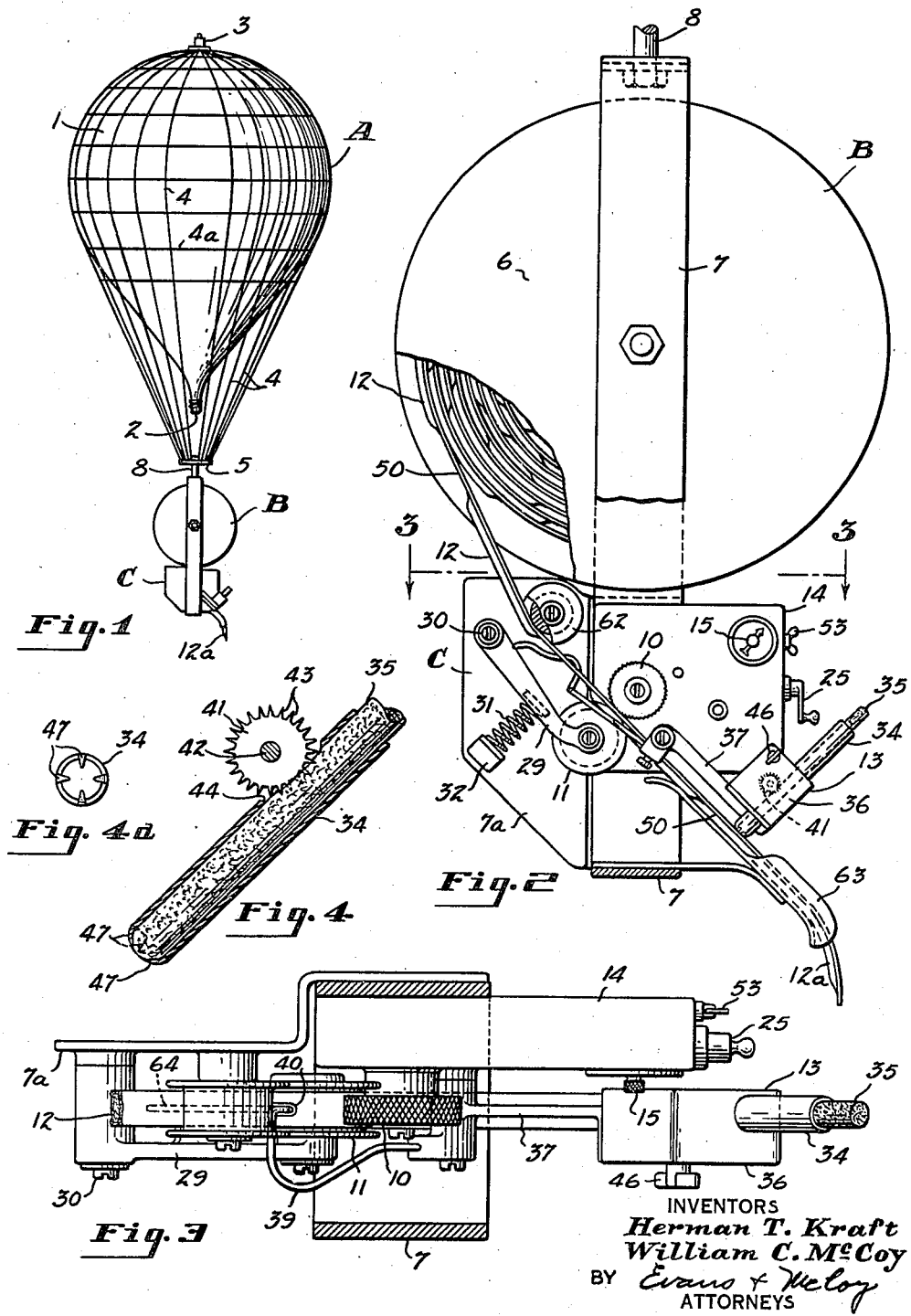

INVENTORS
Herman T. Kraft
William C. McCoy
BY Evans & McCoy
ATTORNEYS

April 18, 1944.    H. T. KRAFT ET AL    2,347,163
BALLOON FOR CARRYING INCENDIARY MATERIAL
Filed April 5, 1940    3 Sheets-Sheet 3
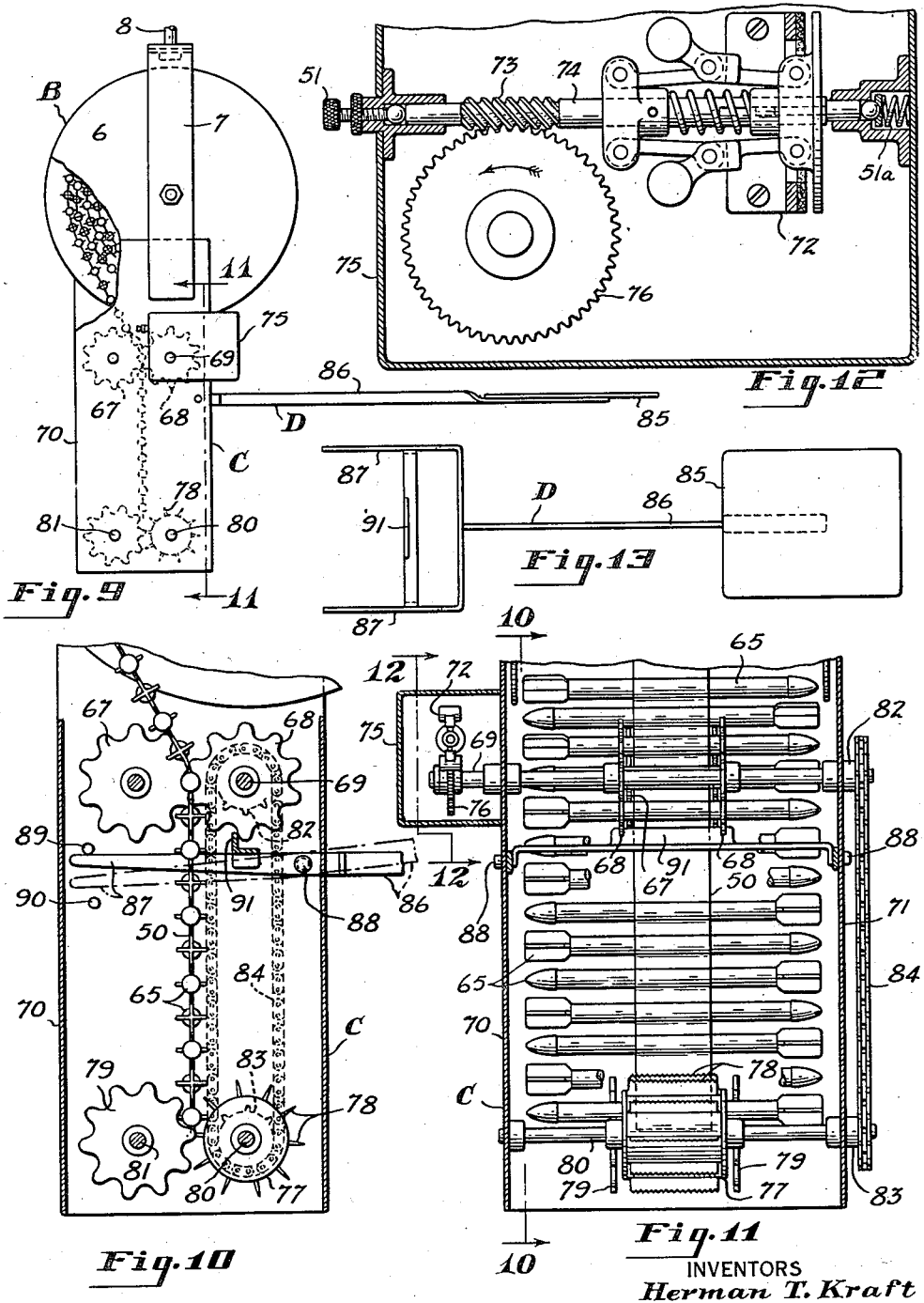
INVENTORS
Herman T. Kraft
William C. McCoy
BY Evans & McCoy
ATTORNEYS Patented Apr. 18, 1944

2,347,163

UNITED STATES PATENT OFFICE 2,347,163

BALLOON FOR CARRYING INCENDIARY MATERIAL

Herman T. Kraft, Akron, and William C. McCoy, Shaker Heights, Ohio, assignors to The General Tire & Rubber Company, Akron, Ohio, a corporation of Ohio Application April 5, 1940, Serial No. 328,062

6 Claims. (Cl. 89—1.5)

This invention relates to apparatus for automatically dropping flares, darts, incendiary bombs and the like at regular intervals over the territory of an enemy power in time of war.

At certain seasons of the year, the forests, grain and hay fields, as well as the buildings of countries are particularly susceptible to ignition. If at such periods a large amount of incendiary material was dropped indiscriminately over the terrain of the country, great damage might be done to its resources so that its effectiveness would be greated decreased.

It is, therefore, an object of this invention to provide a suitable device for carrying a large number of small packages of incendiary material great distances into a belligerent country, which device will drop such materials in effective form at suitable intervals after a predetermined time.

Another object of this invention is to provide a relatively inexpensive, lighter-than-air device capable of carrying strips or belts, having suitably spaced incendiary packages, over the territory of an enemy, which device will light any fuses on the incendiary material and will individually release the packages of incendiary material.

A further object of this invention is to provide an inexpensive balloon-carried device for distributing incendiary packages, wherein the distribution of the packages is controlled by the changes in elevation of the device and by the direction of prevailing winds.

Other objects will become apparent from the following detailed description of the invention, as illustrated by the accompanying drawings, in which:

Figure 1 is a side elevation of suitable apparatus showing the incendiary storage and distributing portions of the device attached to the balloon;

Fig. 2 is a side elevation of the storage, distributing and igniting portions of the apparatus of Fig. 1 with parts broken away to show suitable incendiary material and a suitable feeding mechanism;

Fig. 3 is a sectional view on the line 3—3 of Fig. 2 showing the igniting and feeding mechanism;

Fig. 4 is a longitudinal view through the igniter tube showing the igniter stick and means for feeding it at the desired rate;

Fig. 4a is an end view of the igniter tube showing the prongs for preventing the passage of unburned material through the igniter tube;

Fig. 9 is a side elevational view of the storage and distributing portion of a form of our invention suitable for distributing darts and small bombs;

Fig. 10 is a side elevational view of the distributing portion of the device with portions broken away to show the mechanism as viewed on the line 10—10 of Fig. 11;

Fig. 11 is a sectional view on the line 11—11 of Fig. 9;

Fig. 12 is a sectional view on the line 12—12 of Fig. 11; and

Fig. 13 is a plan view of the vane and latch for starting and stopping the operation of one form of the device.

Figure 5:
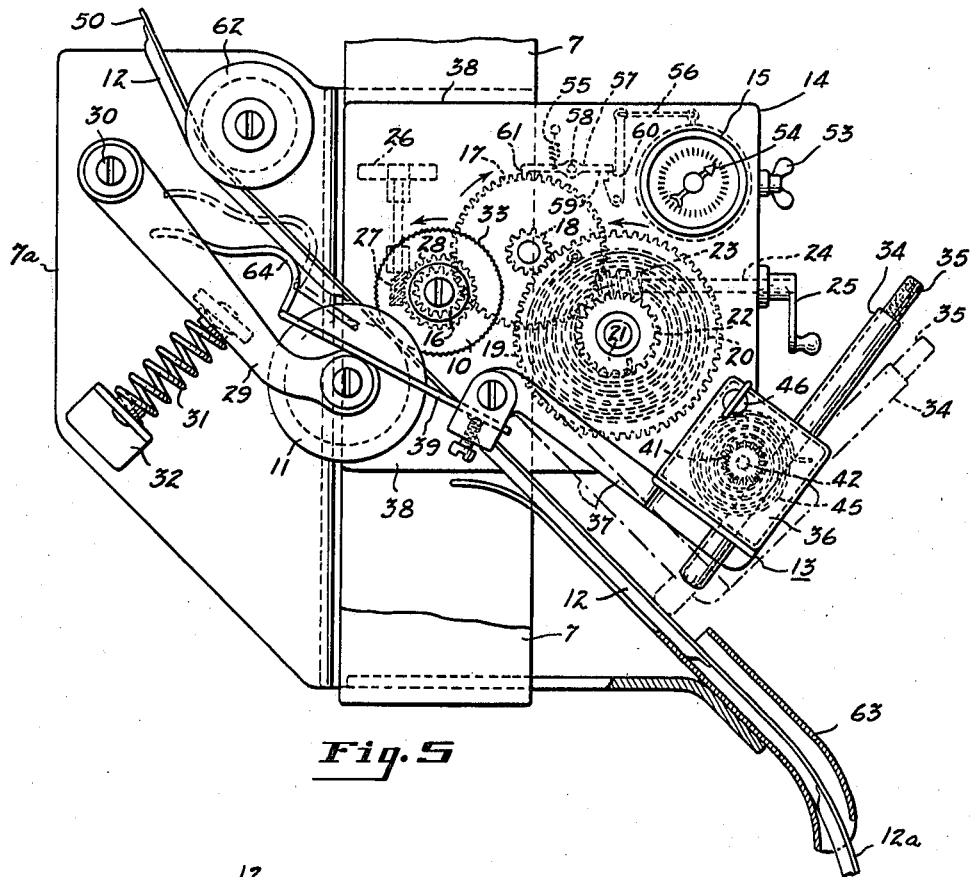
Fig. 5 is an enlarged elevational view of the feeding, igniting and timing portion of the apparatus.

Referring to the drawings by letters and numerals of reference which illustrate like parts throughout the several views, a suitable device has a lifting member A, which is preferably a balloon, a suitable container B carried by said lifting member for storing incendiary material in readily removable form, and an automatic distributing device C for removing individual packages of incendiary material from the container and distributing them at suitable intervals.

The lifting member or balloon may be economically constructed of "Pliofilm Cellophane," rubber-like material, or other material capable of holding gas therein for a sufficiently long period of time. It is provided with a suitable closable opening 2 for filling the balloon with gas, such as a hydrogen, and preferably has a pressure relief valve 3 which is adjusted so as to allow some of the gas in the balloon to escape before the differential pressure becomes sufficiently great to cause bursting of the balloon fabric, or the lower end may be left partially open.

The incendiary storage and distributing portions of the device may be attached to the balloon by suitable means, such as netting, which may comprise a plurality of longitudinal cords 4 held in suitably spaced relation around the balloon by the cross cords 4a. Opposite ends of the cords 4 may be attached to the anchoring member 5 and to a suitable ring (not shown) at the top of the balloon. With such a supporting envelope, considerable reinforcement is provided for the balloon 1 and it is accordingly unnecessary to use heavily reinforced fabric.

The storage container B for incendiary material preferably comprises a reel 6 which is rotatably carried by the supporting frame 7 which also carries the timing and distributing portion C of the device. The supporting frame is attached to the anchoring member 5 by the bolt 8.

Figure 6:
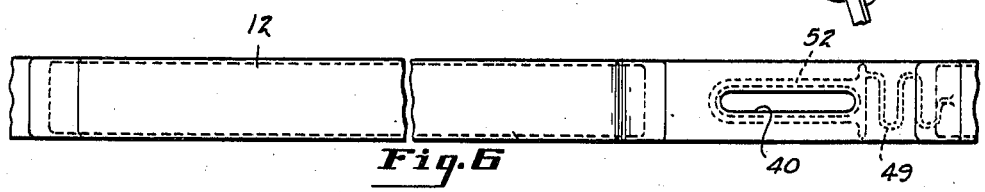
Fig. 6 is a plan view of suitable incendiary material.
Figure 7:
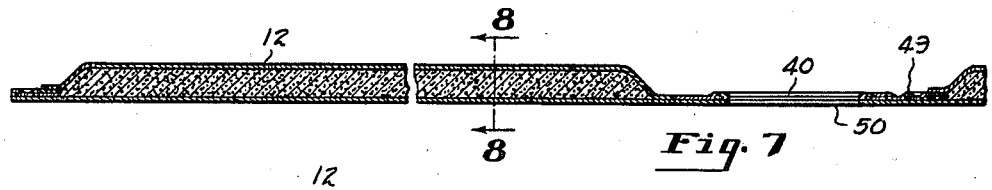
Fig. 7 is a longitudinal sectional view of the material of Fig. 6.
Figure 8:
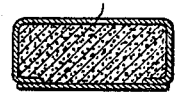
Fig. 8 is a sectional view on the line 8—8 of Fig. 7.

When the incendiary material on the reel 6 is of a type shown in Figs. 6 and 7, which requires the igniting of a fuse prior to dropping, a suitable distributing and igniting device such as is illustrated in Figs. 1 to 6 may be used. Such a device comprises means, such as a driven feed member or roll 10, which cooperates with a pressure roll 11, for unwinding the reel 6 and withdrawing the strips having incendiary packages 12 spaced thereon at a suitable rate from the container; means, such as an igniter 13, for igniting and separating the separate packages of incendiary material; means, such as a motor 14, for driving the feed rolls at a suitable rate; and means, such as a suitable timing device 15, for starting the motor 14 at the desired time.

The axes of feed rolls 10 and 11 are parallel to the flat surfaces of the incendiary strips and the rolls are mounted below and substantially in alignment with the reel 6. The roll 10 is suitably connected by the train of gears 16, 17 and 18 to the gear 19. The gear 19 is driven by the spring 20, which is wound on the drum 21 with one end of the spring suitably attached to the gear 22 and one end attached to the gear 19, which rotates on the drum 21. The gear 22 meshes with the worm 23 carried on the shaft 24 which is attached to the crank 25. A suitable governor 26, driven by the worm 27 which meshes with the gear 28 suitably attached to the roll 10, regulates the speed of the roll 10.

The frame member 7a is attached to the supporting frame 7 and carries the arm 29 which is pivoted about its axis 30 near one of its end portions. The arm 29 which carries the pressure roll 11 rotatably mounted at its free end is forced in an upward direction by the spring 31 mounted between the arm 29 and the lug 32 attached to the frame member 7a, thereby firmly pressing any material disposed between the rolls 10 and 11 against the knurled surface 33 of the feed roll 10.

The igniter 13 has a holder 34 for carrying the igniting or burning material 35, such for example as an igniter rope such as commonly used for cigarette lighters of the German or French type, punk, or other means; and means, such as the feed mechanism, in the container 36 for maintaining the burning portion of the igniter rope at the end of tube or holder 34. The holder 34 and the container 36 are carried by the igniter arm 37 which is pivotally mounted on the motor frame 38; which is also carried by the supporting frame 7. Means, such as the arm 39 which cooperates with a slot 40 in the strip of paper carrying incendiary material, is provided for moving the burning portion of the igniting material 35 into contact with the desired portions of the strip and moving it away from contact with other portions.

The feed mechanism comprises a rotatable spur wheel 41 mounted on a shaft 42 so that the sharp spurs 43 may extend through the opening 44 in the tube or holder 34 and into the body of the burning material or punk 35. A torque, applied to the wheel 41 by means such as the spring 45 in which energy may be stored by turning the winding stem 46, connected by suitable gearing (not shown) to the spring 45, forces the punk 35 against suitable restricting members such as the prongs 47 located at the end of the holder tube 34.

The prongs 47 extend toward each other sufficiently to prevent the passage of the unburned igniter rope, punk or burning material through the igniter tube, but covers an insufficient part of the opening 48 to stop the burning or prevent the ash from dropping away from the igniter rope.

The incendiary packages 12 may be covered with water-resistant paper, or other suitable covering, and may contain any suitable incendiary material, such as solid oil covered with burlap, cotton waste soaked with turpentine, etc. Provision may also be made to incorporate a small amount of explosive to assist in scattering fragments of such material. The packages 12 are connected by a relatively slow burning fuse 49 in the paper web or belt 50 to a layer of readily ignitable material, such as a layer of powder 52, which is disposed completely across the connecting paper or belt 50 at suitable points adjacent the slot 40.

The timing device may comprise the usual clock mechanism which is wound by turning the winding key 53 and adjusted by turning the indicator 54, a suitable linkage 56 attached to the clock, and a spring actuated latch 57 which is pivotally mounted about the pivot 58. When the end 59 of the latch 57 is disposed over the ledge 60 of the link 56, the locking portion 61 is held between the teeth of the gear 17 and thus prevents the operation of the motor; whereas, when after the desired time the linkage 56 is moved by the clock so that the ledge 60 is not in contact with the end 59, the spring 55 rotates the latch 57 about the pivot 58, withdrawing the locking portion from between the gear teeth, and the roll 10 is then rotated by the motor.

When the device illustrated in Figs. 1 to 5 is prepared for operation, a suitable quantity of strip material or paper 50 having incendiary packages suitably spaced thereon is coiled on the reel 6, the free end being threaded successively over the idler pulley 62, which is carried by the frame member 7a between the rolls 10 and 11 and through the guide 63 as shown. The balloon or bag 1 is filled with gas through the opening 2. The indicator 54 is set to release at the desired time, the clock is wound, a piece of burning material, such as a punk 35, is inserted in the holder 36, and energy is stored in the motor by turning the crank 25.

The device is then released, and after the indicated time a suitable movement of the clock mechanism trips the latch 58, permitting the rolls to rotate, thus withdrawing the coiled material from the reel 6.

When a slot 40 in the paper is in register with the cam portion 64 of the arm 39, the igniter is permitted to move by gravity so that the burning material in the tube 34 contacts a powder layer 52 which is thereby ignited. The burning of the powder and the adjacent paper separates the package of incendiary packages 12 in the guide 63 from the remainder of the strip and ignites the fuse 49.

When a slot 14 is moved by further rotation of the rolls 10 and 11, the cam 64 is moved downwardly and the igniter is thus raised out of contact with the incendiary material, thus completing a cycle in preparation for receiving the next package.

Figs. 9 to 13, inclusive, illustrate a modification of our device which is preferably for releasing small bombs, darts, etc. which ignite by impact. Such bombs, darts, etc. may be filled with materials similar to the usual incendiary dart, wherein a main charge of rosin, barium chloride, aluminum powder and combustible binder is ignoted by a booster charge of reduced iron, potassium nitrate and sulphur, the booster charge being ignited in this case by a suitable impact igniter.

The darts 65 are arranged in spaced relation on a suitable paper belt 66, which is wound on the reel 6 similar to that of the prior modification.

Suitable means for withdrawing and separately releasing the incendiary packges in effective form comprises cooperating, rotating members or toothed discs 67 and 68 arranged so that the teeth overlap. The teeth of the discs 67 and 68 are suitably spaced and shaped as shown to interlock with the packages of incendiary material. The disc 68 is attached to the shaft 69 journaled in the frame members 70 and 71. The rate of releasing the packages is determined by the speed of the discs or rolls 67 and 68, and is limited by a suitable means, such as the governor 72, which may be adjusted by turning the screw 51 and compressing the spring 51a. The governor 72 is driven by the worm 73 which is carried by the governor shaft 74 suitably journaled in the governor frame 75, and which meshes with the worm gear 76 attached to the shaft 69. Separated from the discs 67 and 68, by a distance such that the weight of the unseparated, vertically held belt of incendiary matter is sufficiently great to operate the distributing mechanism, is a suitable, rotatable knife drum 77, which has a plurality of sharp knives 78 having serrated or notched edges to facilitate severance of the paper 50, and cooperating backing discs 79. The knife drum 77 and the discs 79 are carried on the shafts 80 and 81, respectively, which are journaled in the frame members 70 and 71. The shafts 69 and 80 carry sprockets 82 and 83, respectively, which are connected together by the chain 84.

Any suitable timing device may be used to prevent the operation of the device until the desired time has elapsed, or the device may be provided with means operable by the changes in its elevation to lock the releasing mechanism when the lifting member is rising, and to unlock the mechanism when the lifting member or balloon is falling relative to the air adjacent its surfaces.

Such means may include a vane-operated latch D having a vane 85 carried by an arm 86 having a forked end member 87 which is pivotally carried by the studs 88 attached to the frame members 70 and 71. Stops 89 and 90, carried by the frame members 70 and 71, cooperate with the worked end 87 to limit the rotational movement of the arm about the pivot or studs 88. The latch portion 91, carried by the arm 86, extends between the forked members 87 and under the gear 68. The pivots 87 and stops 89 and 90 are so located that the latch 91 extends between the teeth of the gear 68 when the end members 87 are in contact with stop 89. When the stops 90 are in contact with the end members 87, the latch 91 is withdrawn from between the teeth, permitting the gear 68 to turn freely.

In the operation of the device, the incendiary material in strip form is wound on the reel 6 and the free end threaded between the discs 67 and 68, and between the discs 79 and the knife drum 77.

When the device is rising, the air passing adjacent the vane which is balanced about the pivots 88 causes it to press the latch portion 91 between the teeth of the gear, thus preventing operation of the distributing mechanism. When the maximum elevation has been reached and the device begins to fall due to atmospheric changes or loss of gas from the lifting member, vane 85 is moved in an upward direction, thereby withdrawing the latch member from between the gear teeth, permitting the rotation of the gear 68.

The weight of the strip of incendiary material between gears 67 and 79 is sufficient to withdraw material from the reel 6 and to cause the rotation of the gears 67, 68, 79 and the knife drum 77 at the rate permitted by the governor 72, thus separating individual packages from the belt of incendiary material.

When the loss of incendiary material is sufficient to cause the balloon to rise again, the latch 91 again stops the gear 68. Separation of incendiary material again starts when the balloon loses altitude relative to surrounding air.

It will be seen that the latter modification of this invention, wherein the distribution of incendiary packages is dependent on loss of altitude, will enable the incendiary material to be efficiently carried great distances into the enemy territory.

It is well known that the heat from factories and towns causes upward currents of air in such vicinities, and these air currents will operate the vane to release materials in these areas more frequently than in the less populated areas.

The device and the incendiary material used are comparatively inexpensive so that a great number of such units may be released simultaneously, thus effecting substantial damage to the enemy.

It is to be understood that variations and modifications of the specific device herein shown and described for purposes of illustration may be made without departing from the spirit of the invention.

What we claim is:

1. A device carried by a lighter-than-air lifting member for automatically dropping packages of incendiary material and the like at intervals, comprising a container having a reel for holding a strip having incendiary packages spaced thereon, means for attaching said container to said lifting member, means operable by the weight of the packages for automatically withdrawing said strip from said container and separately releasing the said packages in effective form as freely falling bodies, and means dependent on the change in elevation of the device for controlling the operation of said withdrawing means.

2. A device carried by a lighter-than-air lifting member for automatically dropping packages of incendiary material and the like at intervals, comprising a container carried by said lifting member for holding a strip of incendiary material in readily removable form, means, comprising a rotatable member having a contour complemental to said strip for automatically withdrawing the strip from said container, and a knife for separating the packages, means for controlling the rate of withdrawing and releasing the incendiary material as freely falling bodies, and means, operable in accordance with the rise or fall of said device relative to adjacent air, for stopping or starting the release of said packages.

3. A device carried by a lighter-than-air lifting member for automatically dropping packages of incendiary material and the like at intervals, comprising a container having a reel for holding a strip having incendiary packages spaced thereon, means for attaching said container to said lifting member, and means operable by the weight of the packages for automatically withdrawing said strip from said container and separately releasing the said packages in effective form as freely falling bodies.

4. A device adapted to be carried by a lighter than air lifting device comprising a container for storing a strip of incendiary material in readily withdrawable form, automatically operated means for withdrawing said strip from said container and for severing, separating and releasing a plurality of successive portions from an end of the strip of incendiary material as freely falling bodies, each portion being arranged successively on said strip so that a successive portion is only at the end of said strip after the separation of the next preceding end portion, means for controlling the rate at which the incendiary material is withdrawn from the container, and means for controlling the periods when portions of the material are severed and released as freely falling bodies.

5. A device carried by a lighter than air lifting member for automatically dropping incendiary material at desired intervals, comprising a container for storing a strip of incendiary material, means for fastening said container to said lifting member, means comprising a feed member for automatically withdrawing the strip of incendiary material from the container at a suitable rate, and means for separating successive end portions of said strip and periodically releasing them as freely falling bodies.

6. A device carried by a lighter than air lifting member for automatically dropping incendiary material at desired intervals, comprising a single container for storing a strip having a plurality of packages of incendiary material successively arranged thereon, means for fastening said container to said lifting member, means comprising a feed member for automatically withdrawing the strip material from the container at a suitable rate, and means for separating successive end portions of said strip and periodically releasing them as freely falling bodies.

HERMAN T. KRAFT.
WILLIAM C. McCOY.